No. 659,240. Patented Oct. 9, 1900.
T. LEE.
FEEDING DEVICE FOR CARDING MACHINES.
(Application filed Mar. 1, 1899.)
(No Model.)
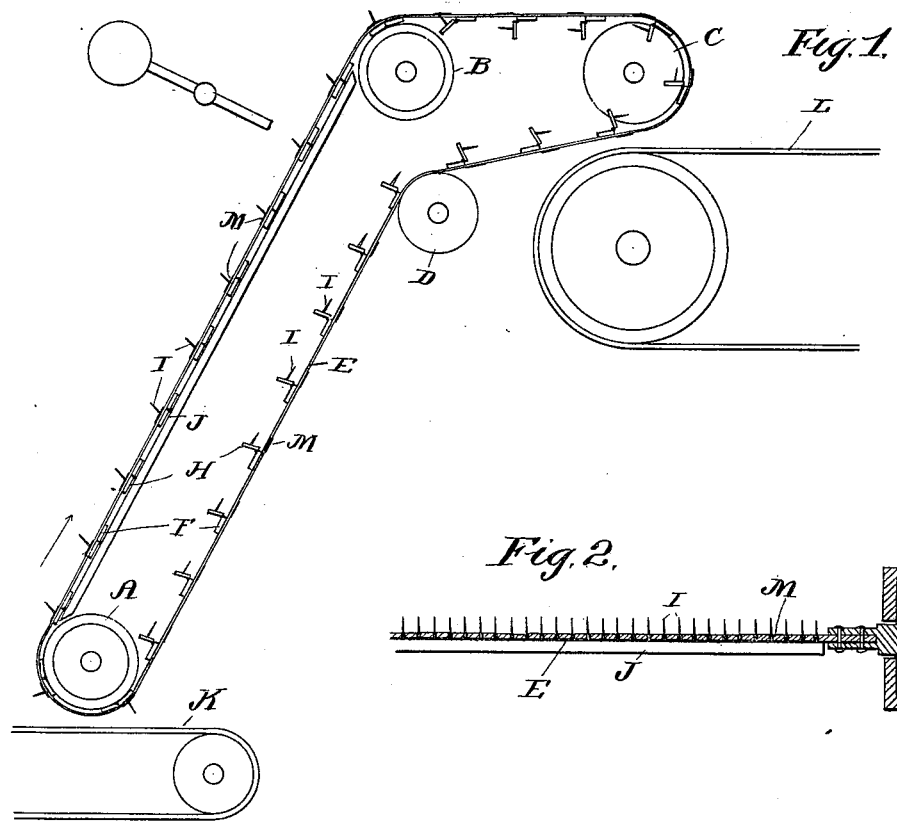
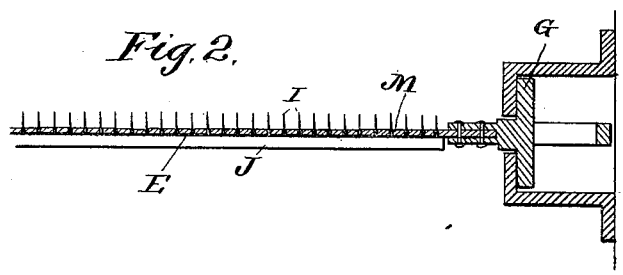
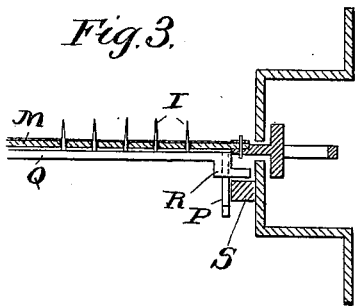
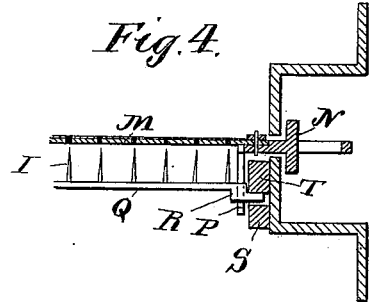
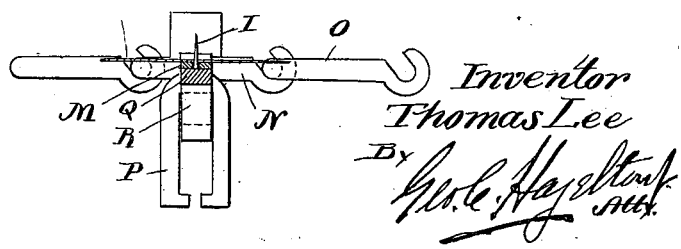
Witnesses
Samuel Stuart
William Preston
Inventor
Thomas Lee
By Geo. E. Hazelton
Atty.
THE NORRIS PETERS CO., PHOTO-LITHO., WASHINGTON, D. C.

UNITED STATES PATENT OFFICE.

THOMAS LEE, OF PHILADELPHIA, PENNSYLVANIA.

FEEDING DEVICE FOR CARDING-MACHINES.

SPECIFICATION forming part of Letters Patent No. 659,240, dated October 9, 1900.

Application filed March 1, 1899. Serial No. 707,332. (No model.)

*To all whom it may concern:*

Be it known that I, THOMAS LEE, a citizen of the United States, residing at Philadelphia, in the county of Philadelphia and State of Pennsylvania, have invented a certain new and useful Improvement in Feeding Devices for Wool and Other Material, of which the following is a specification.

My invention relates to a new and useful improvement in feeding devices for wool and other material when said material is to be transferred from one point to another, being treated for industrial purposes, and has for its object to provide a single carrier-apron and so arrange series of teeth in connection therewith as to cause said teeth to project through the apron to engage and convey the material and then withdraw said teeth, so as to disengage them therefrom, and thereby prevent any tendency of the material being carried rearward upon the return movement of the apron.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a diagram of my improved feeding mechanism, showing it arranged in connection with aprons for conveying the material to the feeding mechanism and carrying it therefrom after being elevated; Fig. 2, an enlarged section of a portion of one of the cross-pieces carrying a series of teeth, said teeth projecting through the apron; Fig. 3, a view similar to Fig. 2, showing a slightly-modified form of construction in which the cross-strip carrying the teeth is guided by a bracket depending from the apron; Fig. 4, a similar view of this construction, showing the teeth withdrawn from the apron; and Fig. 5, a section taken crosswise of the cross-strip, showing the form of guide-bracket.

In carrying out my invention as embodied in Figs. 1 and 2, A, B, C, and D represent drums, over which the apron E is arranged to travel, and this apron has secured to its inner surface a series of cross-strips F, which are connected to the links G of the carrier-chains. To each of these strips is hinged a strip H, having the teeth I set therein, so that when these last-named strips are swung parallel with the apron the teeth will pass through the latter, as clearly shown upon the left of Fig. 1. J is a guide-strip so located as to hold the hinged strips H in parallelism with the apron when traveling upon one side of the device, by which arrangement the hinged strips when reaching the drum A will be swung into contact with the apron, the teeth thereof passing through said apron, in which relative position they will remain while passing around this drum and will be prevented from swinging inward by immediately passing into engagement with the strip J.

When the toothed strips pass beyond the drum B, they will be free to swing downward, thereby carrying their teeth below the surface of the apron, and thus disengaging said teeth from the material being conveyed. After the toothed strips have been thus swung downward they will remain in this relative position until again reaching the drum A, where the operation just described will be repeated.

In practice when material is conveyed to the feeding mechanism by the apron K the teeth I will engage this material and elevate it in the direction of the arrow, retaining their hold thereon until the teeth have been withdrawn from the apron, as before described, after which the material will be free to fall from the apron at the point where the latter turns the drum C, and thus be precipitated upon the apron L or other suitable device. If found desirable, protecting-strips M may be secured upon the apron, having holes therethrough for the passage of the teeth to render the apparatus more durable at these points. From this description it is obvious that a positive hold will be taken upon the material to be elevated and fed during that portion of the operation when such a hold is essential; but this hold will be released at the point where it is necessary to deposit the material, thus avoiding the disadvantage heretofore experienced in the tendency to carry the material rearward or to remove it from the teeth.

In practice I have found that this construction is exceedingly simple and effective and not liable to become disarranged, and as each strip carrying the teeth is hinged to the apron said teeth will always positively register with the holes through which they are to pass. It is to be noted that the strip J is arranged upon each side of the apron, so as to engage both ends of the cross-strips.

In Figs. 3, 4, and 5 I have shown a construction that slightly differs from the one above described, but in all essentials accomplishes the same result and in substantially the same manner. This construction consists of securing to or forming with the links N of the carrier-chains O depending brackets P, said brackets being slotted or forked, so as to form guides for the toothed cross-pieces Q, the latter having extensions R thereon, adapted to fit within these guideways and also projecting inward beyond the brackets, whereby they are adapted to ride upon the guides S, arranged along the sides of the apparatus. These guides are so arranged as to force the toothed strips upward at the proper time, thereby carrying the teeth through the apron for the purpose before set forth, and the teeth are withdrawn from the apron by means of the guides F, arranged to act upon the opposite sides of the extensions R for drawing the toothed cross-pieces inward, as shown in Fig. 4.

While I am aware that attempts have been made to arrange teeth so that they would first project and then be withdrawn, I have discovered by experiment that it is absolutely essential to the successful working of such a device that the teeth be positively connected with the traveling member, so as to always accurately register with the holes through which they are to pass, and this feature I desire to be understood as claiming broadly.

Having thus fully described my invention, what I claim as new and useful is—

1. A carrier-apron or the like having cross-strips so connected thereto as to move positively in unison therewith, teeth carried by said strips, and means for causing said teeth at predetermined times to pass through said apron and be withdrawn therefrom, as specified.

2. A feeding device of the character described consisting of an endless traveling apron mounted upon suitable drums, a series of cross-strips secured to said apron, a corresponding series of strips hinged to the first-named strips, teeth projecting from each of the last-named strips, and means for swinging said teeth through the apron at predetermined times and withdrawing them therefrom, as and for the purpose set forth.

In testimony whereof I have hereunto affixed my signature in the presence of two subscribing witnesses.

THOMAS LEE.

Witnesses:
MARY E. HAMER,
SAMUEL STUART.